(12) United States Patent
Peters et al.

(10) Patent No.: US 9,727,645 B2
(45) Date of Patent: *Aug. 8, 2017

(54) METHOD AND SYSTEM OF SCORING DOCUMENTS BASED ON ATTRIBUTES OBTAINED FROM A DIGITAL DOCUMENT BY EYE-TRACKING DATA ANALYSIS

(71) Applicants: Richard R Peters, Mill Valley, CA (US); Amit Karmarkar, Palo Alto, CA (US)

(72) Inventors: Richard R Peters, Mill Valley, CA (US); Amit Karmarkar, Palo Alto, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/164,753

(22) Filed: Jan. 27, 2014

(65) Prior Publication Data

US 2015/0213123 A1 Jul. 30, 2015
US 2017/0177720 A9 Jun. 22, 2017

Related U.S. Application Data

(63) Continuation-in-part of application No. 13/234,126, filed on Sep. 15, 2011, now Pat. No. 8,719,278.

(60) Provisional application No. 61/528,720, filed on Aug. 29, 2011.

(51) Int. Cl.
G06F 7/00 (2006.01)
G06F 17/30 (2006.01)

(52) U.S. Cl.
CPC .. G06F 17/30864 (2013.01); G06F 17/30011 (2013.01); G06F 17/30032 (2013.01); G06F 17/3053 (2013.01); G06F 17/30964 (2013.01)

(58) Field of Classification Search
None
See application file for complete search history.

(56) References Cited

U.S. PATENT DOCUMENTS

| | | | | |
|---|---|---|---|---|
| 2004/0212712 | A1* | 10/2004 | Stavely | A61B 3/113 348/333.03 |
| 2010/0004977 | A1* | 1/2010 | Marci | G06Q 10/10 705/7.32 |
| 2012/0236143 | A1* | 9/2012 | Weatherhead | H04H 60/45 348/135 |
| 2013/0024272 | A1* | 1/2013 | Pradeep | G06Q 30/0242 705/14.42 |

* cited by examiner

*Primary Examiner* — Tuan A Pham

(57) ABSTRACT

In one exemplary embodiment, a set of attributes derived from an element of a first digital document is obtained. The element is identified from eye-tracking data of a user viewing the digital document. A search query of a database comprising at least one query term is received. A set of documents in the database is identified according to the search query. An attribute score is determined for each document. The set of documents are sorted according to the attribute score. Optionally, a commonality between the query term and at least one member of the set of attributes ma be determined. The search query may be generated by the user. The database may be a hypermedia database.

18 Claims, 11 Drawing Sheets

METHOD AND SYSTEM OF SCORING DOCUMENTS BASED ON ATTRIBUTES OBTAINED FROM A DIGITAL DOCUMENT BY EYE-TRACKING DATA ANALYSIS

CROSS-REFERENCE TO RELATED APPLICATION

This application is a continuation-in-part of and claims priority from U.S. patent application Ser. No. 13/234,126 filed on Sep. 15, 2011 and titled METHOD AND SYSTEM OF SCORING DOCUMENTS BASED ON ATTRIBUTES OBTAINED FROM A DIGITAL DOCUMENT BY EYE-TRACKING DATA ANALYSIS. U.S. patent application Ser. No. 13/234,126 claims priority to U.S. Provisional Application No. 61/528,720, filed Aug. 29, 2011. These applications are hereby incorporated by reference in their entirety.

BACKGROUND OF THE INVENTION

1. Field

This application relates generally to scoring documents, and more specifically to a system and method for scoring documents based on attributes of a digital document by eye-tracking data analysis.

2. Related Art

Eye-tracking systems can be included in many of today's electronic devices such as personal computers, laptops, tablet computers, user-wearable goggles, smart phones, digital billboards, game consoles, and the like. An eye-tracking system may monitor a user as the user engages a digital document (e.g. a static webpage, a dynamic webpage, an e-reader page, a MMS message, a digital billboard content, an augmented reality viewer that can include computer-generated sensory input such as sound, video, graphics or GPS data, a digital photograph or video viewer, and the like). The eye-tracking data (e.g. can include information about a user's eye movement such as regressions, fixation metrics such as time to first fixation and fixation duration, scan paths, gaze plots, fixation patterns, saccade patterns, pupil sizes, blinking patterns and the like) may indicate a coordinate location (such as an x,y coordinate with a time stamp) of a particular visual element of the digital document—such as a particular word in a text field or figure in an image. For instance, a person reading an e-book text may quickly read over some words while pausing at others. Quick eye movements may then be associated with the words the person was reading. When the eyes simultaneously pause and focus on a certain word for a longer duration than other words, this response may then be associated with the particular word the person was reading. This association of a particular word and eye-tracking data of certain parameters may then be analyzed. In this way, eye-tracking data can indicate certain states within the user that are related to the elements of the digital document that correspond to particular eye movement patterns. For example, a particular eye-tracking pattern can be associated with a comprehension difficulty of a word and/or image. Another eye-tracking pattern can indicate a user's interest in a particular image, portion of an image, phrase, etc. A longer duration of gaze upon a visual element may, for example, indicate a greater degree of interest in the element over other elements of a digital document associated with shorter gaze durations.

Eye-tracking data can be collected from a variety of devices and eye-tracking systems. Computing devices frequently include high-resolution cameras capable of monitoring a person's facial expressions and/or eye movements while viewing or experiencing media. Cellular telephones now include high-resolution user-facing cameras, proximity sensors, accelerometers, and gyroscopes and these 'smart phones' have the capacity to expand the hardware to include additional sensors. Thus, video-based eye-tracking, systems can be integrated into existing electronic devices.

Searches of databases of digital documents (e.g. webpages) have become a common activity of modern life. Typical search engines search for the words or phrases as they are entered in the search query. However, this can be a problem when entered words have multiple meanings. "Bed," for example, can be a place to sleep, a place where flowers are planted, the storage space of a truck or a place where fish lay their eggs. One particular meaning may be more relevant to a user's current state, and the other meanings may be irrelevant. A user can build search queries that endeavor to eliminate unwanted meanings, but this process can be time consuming and require multiple trial and error attempts.

Thus, a method and system are desired for using eye-tracking data collected from prolific digital devices to obtain information about a user's state (e.g. interests, comprehension difficulties and the like) as related to elements of a digital document to improve beyond existing methods of sorting other documents according to their relevance to a search query performed by a user.

BRIEF SUMMARY OF THE INVENTION

In one exemplary embodiment, a set of attributes derived from an element of a first digital document is obtained. The element is identified from eye-tracking data of a user viewing the digital document. A search query of a database comprising at least one query term is received. A set of documents in the database is identified according to the search query. An attribute score is determined for each document. The set of documents are sorted according to the attribute score.

Optionally, a commonality between the query term and at least one member of the set of attributes may be determined. The search query may be generated by the user. The database may be a hypermedia database.

BRIEF DESCRIPTION OF THE DRAWINGS

The present application can be best understood by reference to the following description taken in conjunction with the accompanying figures, in which like parts may be referred to by like numerals.

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Process Overview

Disclosed are a system, method, and article of manufacture for scoring documents based on attributes of a digital document by eye-tracking data analysis. Although the present embodiments have been described with reference to specific example embodiments, it will be evident that various modifications and changes may be made to these embodiments without departing from the broader spirit and scope of the various claims.

Figure 1:
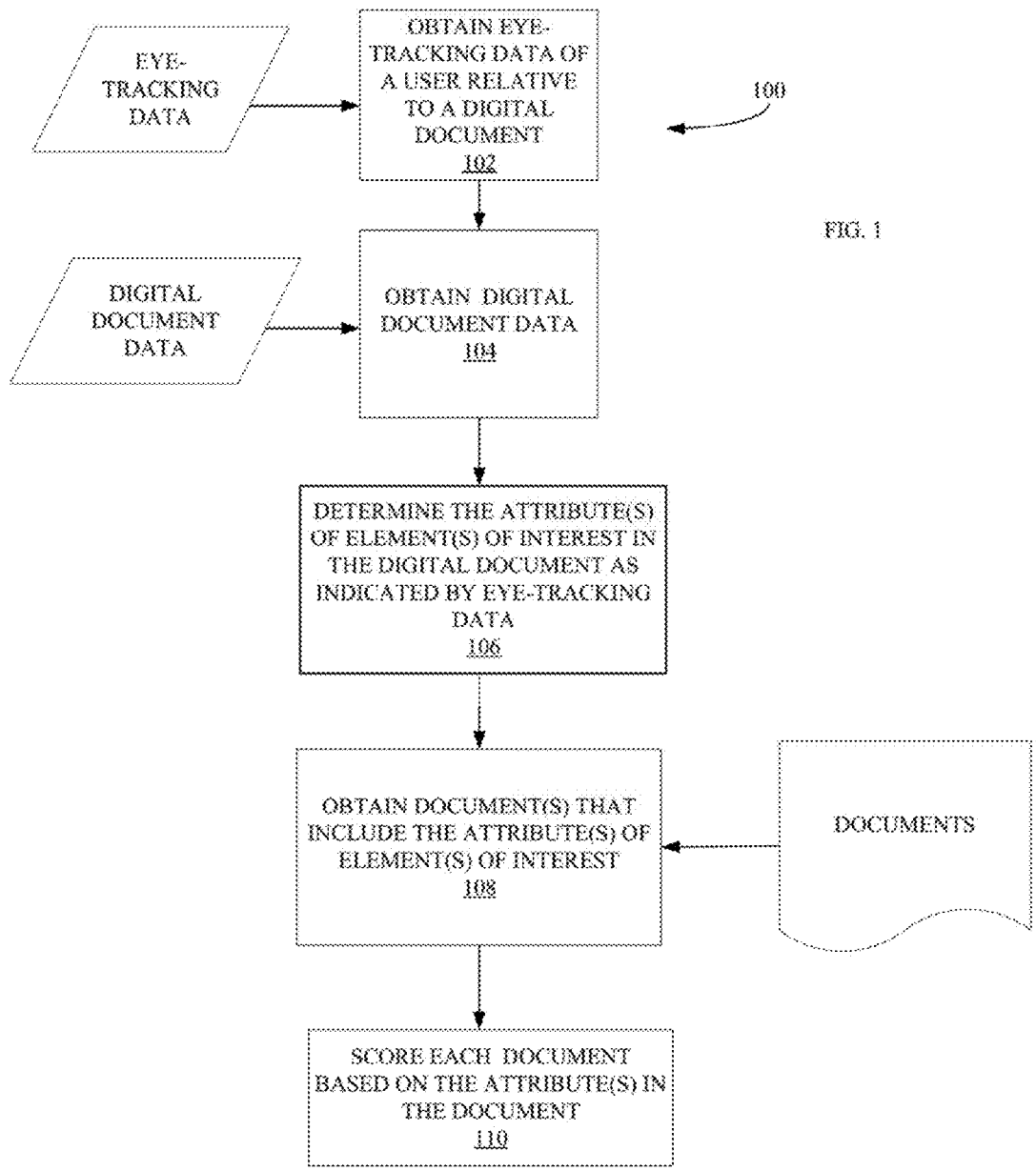
FIG. 1 illustrates an exemplary process for sorting documents according to user's state as indicated by eye-tracking data.

FIG. 1 illustrates an exemplary process for scoring documents based on attributes of a digital document by eye-tracking data analysis. In step 102 of process 100, eye-tracking data of a user relative to a digital document is obtained. A digital document (e.g. a webpage document, an email, a text message, a may be presented with a graphical user interface (GUI) of a computing device (e.g. a personal computer, a laptop computer, a smartphone, a tablet computer, a digital billboard, an e-book reader, a personal digital assistant, a digital media player and the like). Eye-tracking data may be any data that is generated by monitoring a user's eye motions. The computing device may include an eye-tracking system that tracks eye-movement and/or be communicatively coupled with an eye-tracking system. Example eye-tracking systems and methods are provided herein in the description of FIGS. 2 and 3, however, the embodiments are not limited thereby. Optionally, a user can manually enable or disable eye-tracking system (e.g. by holding a button, by selecting a web browser option, etc).

In step 104 of process 100, the digital document data is obtained. For example, the digital document data may be obtained by a client application (or communicated to another device such as a remote server) that may then parse the digital document and obtain attributes of the various elements of the digital document. In step 106, attribute(s) of element(s) of interest as indicated by the eye-tracking data can be determined. For example, elements of the digital document can be matched with corresponding eye-tracking data if the eye-tracking data exceeds a specified parameter (e.g. a number of regressions within a period, a fixation of a certain duration, a specified saccadic pattern and/or any combination thereof). In some embodiments, digital documents can be parsed and analyzed for data that provides various attributes of the visual element. Exemplary process include, for example, use of an image's ALT tag to determine attributes of the visual element, use of an image's filename to determine attributes of the visual element, use of surrounding text to determine attributes of the visual element, use of an overall and/or local document theme(s) (such as webpage theme(s), paragraph theme(s), article theme(s), advertisement theme(s), etc) to determine attributes of the visual element, use of methods for extracting document representations (e.g. term-vectors for the keyword fields), etc. If the visual element is a word or phrase, then the meanings of the words can be utilized to determine their respective attributes (e.g. provided by a table that matches terms to meanings). In some embodiments, techniques used by web crawlers to determine and rank attributes of an image, text and/or webpage can be utilized to determine the attributes of visual elements (e.g. search of a robots.txt file, analysis of outbound hyperlinks, analysis of HTML and/or XML elements and/or other metadata tags, etc.). Additionally, in a case where the visual element is an image, color attributes of the digital image as represented by numerical values in the image's matrix representation can be stored as attributes. Furthermore, in some embodiments, image recognition algorithms can be used to identify the content of an image using various object recognition, identification and/or detection algorithms. For example, facial and/or image recognition algorithms can be utilized to determine the identity of persons in an image. Other operations that can be performed include: content-based image retrieval, pose estimation, and/or optical character recognition operations. The embodiments are not limited by the above examples and may include other methods of extracting attributes from elements of digital documents.

Optionally, the attributes can also be ranked according to such factors as the values of corresponding eye-tracking data (e.g. length of fixation duration, number/frequency of regressions to corresponding element, magnitude of various saccade characteristics and the like), correspondence of attributes with certain user attributes, quality of eye-tracking data (e.g. obtained by an eye-tracking system of a specified accuracy level), frequency of attribute acquisition and/or any combination of various ranking metrics. In some embodiments, other data such as that related to the user's interactions with the digital document (date/time of document viewing, web browser history, mouse paths, other user viewing, behaviors, type of electronic device used to view digital media content, etc.) can be used to rank the attributes as well. For example, attributes from recently viewed documents can be weighted and/or scored higher than attributes with older time stamps. The attributes (and metadata such as ranking data about the attributes) can be stored in a database such as a database that is accessible by a search engine server (e.g. server data store 1008 of FIG. 10). The search engine server can search database types such as, for example, archives, domain-specific collections, enterprise collections, personal collections, and/or the World Wide Web.

It is noted that different measures of eye tracking behavior can be obtained and/or utilized depending on the type of user state that is under investigation. For example, to evaluate the interest that a particular digital document element may create for a user, the number of fixations on the element can be used Other exemplary matches between type of eye-tracking measure and a user state include, inter aria, the average fixation duration on an element (e.g. can indicate user information processing difficulty, among other things) or the time to first fixation on an element (e.g. can indicate its discoverability to a user). Thus, a type of measure of eye-tracking behavior can be selected along with the specified parameters for the various elements of a digital document and/or element type. For example, as digital document can include metadata that provides instructions as to what type of eye-tracking measures to associate with its respective elements. In another example, eye-tracking measure type can be set to the element type and/or formatting (e.g. size, shape, color, location and the like). Thus, for example, as larger image at the top of a web page may require a number of fixations in a certain period to initiate an operation for the attributes to be obtained. On the other hand, a text term may be only requiring a single fixation of 0.75 seconds for its attributes to be obtained. These examples are provides by way of illustration and not of limitation.

In step 108 of process 100, documents that include the attributes of the elements of interest can be obtained. The documents can be configured in a digital format. For example, a search engine can obtain the documents from a database of documents such as the World Wide Web (e.g. the document can be a webpage) or other hypermedia archive, a dictionary or thesaurus, and a database of academic articles, patents, or court cases. The database of documents can be searched to determine which documents include attributes of the elements of interest as determined in the previous steps of process 100. Optionally, an index can be generated that provides information about the documents such as metadata about each document's attribute population (e.g. a list of attributes, characteristics of an attribute such as number, frequency of use, location, prominence, how used, what types of media is it associated with and the like) in order to facilitate the operation of the search engine. In some embodiments, as user can perform a search of the documents and the attributes obtained in the previous steps of process 100 can be used to modify and/or augment the search query terms.

In step 110, the documents can be scored based on the attributes in each document. For example, documents with attributes that match and/or are compatible with the attributes of interest to the user (and/or other aspects of the user's state such a comprehension difficulty) can be scored higher according to such metrics as the number of attributes contained in the document. In one example, attributes can also be scored according to the value of eye-tracking data associated therewith. For example, an attribute derived from an element of a digital document that a user viewed for five seconds can be scored higher than an attribute from another element that a user viewed for half a second. Attributes can also be scored by other parameters such the metadata found in index that can be generated in step 108 above. Additional parameters for scoring attributes can include the physical environmental context of the user when the eye-tracking data was obtained, the device type used to present the digital document to the user, demographic and/or personal information about the user, search query terms, web browsing history and the like. Moreover, further parameters for scoring attributes can include the state of the user as indicated by other bioresponse data (other than eye-tracking data) as well.

For example, an attribute may be derived from a digital document element viewed on a digital billboard. This information can be stored to a database that can be accessed by a search engine server. Eye-tracking data may indicate that a user had a comprehension difficulty with respect to a certain word or image. Later, search query terms may be input by the user on a tablet computer. These terms may indicate the user is seeking additional information from an Internet search engine regarding the element associated with the user comprehension difficulty. Accordingly, documents that can assist the user in resolving the comprehension difficulty can be scored higher if they contain the attributes of the element associated with the user comprehension difficulty. The search engine can then sort the search query results accordingly.

It is noted that, in some embodiments, any combination of steps 102, 104, 106, 108 and 110 can be performed by a client application running in the user-side computing device and/or a server. Additionally, some of the steps can be implemented in a cloud-computing environment when appropriate. Optionally, process 100 can be performed in a recursive manner in that eye-tracking data can be obtained for a user while viewing the search results (e.g. in the case of an image search) presented to the user using process 100. Process 100 can then be performed again with respect to these images and a new set of sorted documents input into and resorted with the first set of sorted documents.

Optionally, process 100 (in whole or in part) can be integrated with other methods of sorting, collections of documents (e.g., sorting of search query results) as well. For example, process 100 can be integrated into a combination of the Vector Space Model (VSM) of information retrieval and the Boolean model to determine how relevant a given document is to user's search query. For example, the Boolean model can first narrow down the document set that is to be scored based on the use of Boolean logic in the query specification. The VSM model can then refine the set of documents provided by the Boolean model in that is the more times a query term appears in a document relative to the number of times the term appears in all the documents in the collection, the more relevant that document may be to the query. Finally, process 100 can be implemented to identify documents that are not only relevant to the query terms but also to the user's interests as determined by eye-tracking data. Likewise, in the example of an image file search, process 100 can be combined with various image search methodologies such as, for example, image meta search and/or content-based image retrieval (CBIR) search methods.

Obtain Eye-Tracking Data

Figure 2:
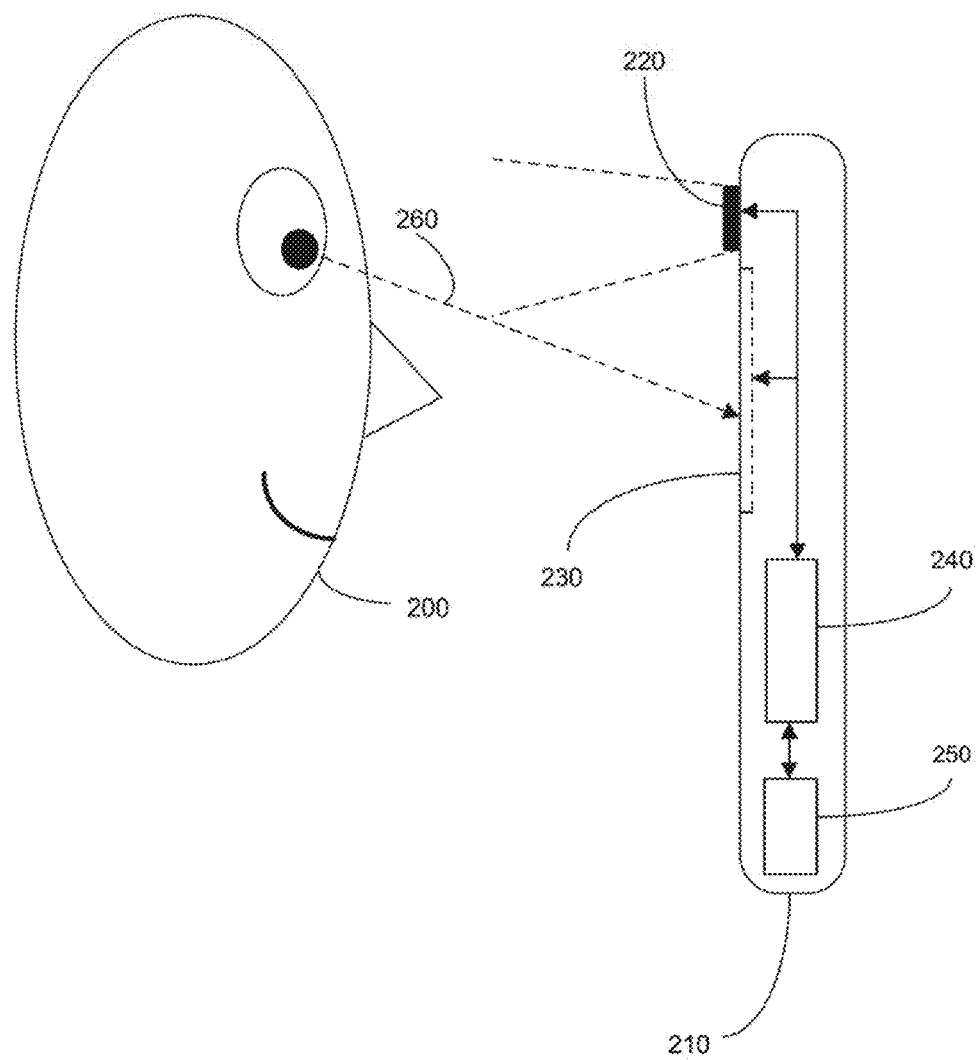
FIG. 2 illustrates one example of obtaining eye-tracking data from a user viewing a digital document.

FIG. 2 illustrates one example of obtaining eye-tracking data from a user viewing a digital document. In this embodiment, eye-tracking module 240 of user device 210 tracks the gaze 260 of user 200. Although illustrated here as a generic user device 210, the as device may be a cellular telephone, personal digital assistant, tablet computer (such as an iPad®), laptop computer, desktop computer, or the like. Eye-tracking module 240 may utilize information from at least one digital camera 220 and/or an accelerometer 250 (or similar device, such as a gyroscope, that provides positional information of user device 210) to track the user's gaze 260. Eye-tracking module 240 may map eye-tracking data to information presented on display 230. For example, coordinates of display information may be obtained from a graphical user interface (GUI). Various eye-tracking algorithms and methodologies (such as those described herein) may be utilized to implement the example shown in FIG. 2.

In some embodiments, eye-tracking module 240 may utilize an eye-tracking method to acquire the eye movement pattern. In one embodiment, an example eye-tracking method may include an analytical gaze estimation algorithm that employs the estimation of the visual direction directly from selected eye features such as irises, eye corners, eyelids, or the like to compute a gaze 260 direction. If the positions of any two points of the nodal point, the fovea, the eyeball center or the pupil center can be estimated, the visual direction may be determined.

In addition, a light may be included on the front side of user device 210 to assist detection of any points hidden in the eyeball. Moreover, the eyeball center may be estimated from other viewable facial features indirectly. In one embodiment, the method may model an eyeball as a sphere and hold the distances from the eyeball center to the two eye corners to be a known constant. For example, the distance may be fixed to 13 mm. The eye corners may be located (for example, by using, a binocular stereo system) and used to determine the eyeball center, in one exemplary embodiment, the iris boundaries may be modeled as circles in the image using a Hough transformation. The center of the circular iris boundary may then be used as the pupil center.

In other embodiments, a high-resolution camera and other image processing tools may be used to detect the pupil. It should be noted that, in some embodiments, eye-tracking module 240 may utilize one or more eye-tracking methods in combination. Other exemplary eye-tracking methods include: a 2D eye-tracking algorithm using a single camera and Purkinje image, a real-time eye-tracking algorithm with head movement compensation, a real-time implementation of a method to estimate gaze 260 direction using stereo vision, a free head motion remote eyes (REGT) technique, or the like. Additionally, any combination of any of these methods may be used.

Figure 3:
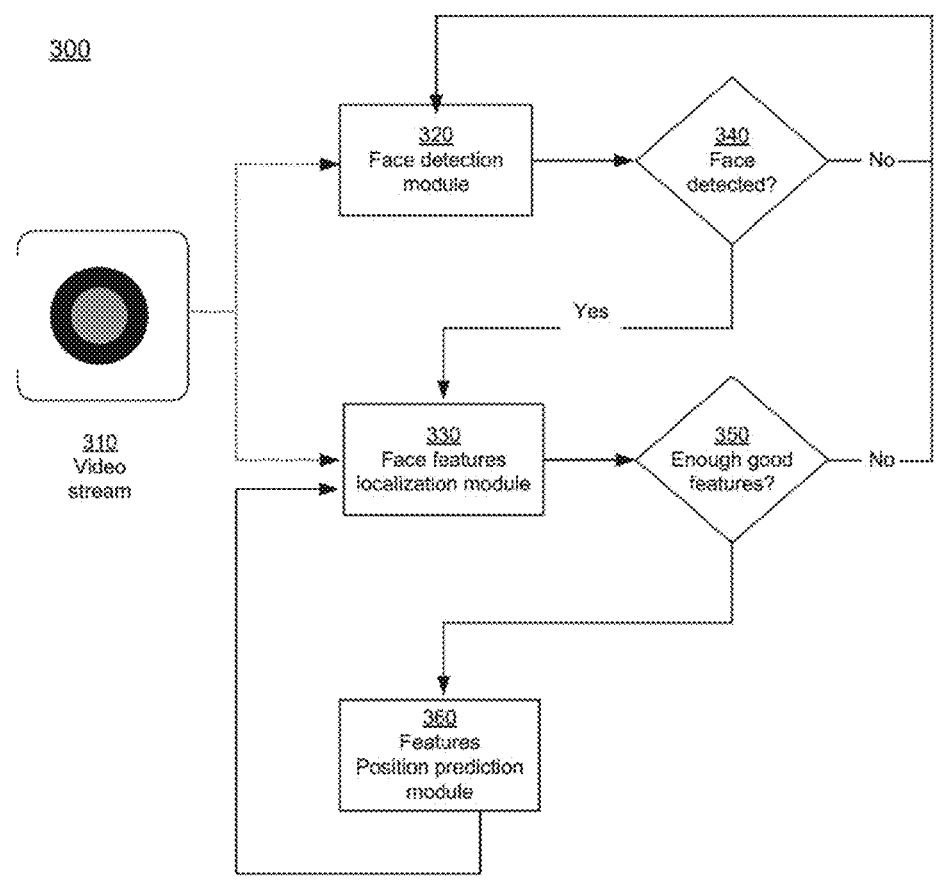
FIG. 3 illustrates exemplary components and an exemplary process for obtaining eye-tracking data.

FIG. 3 illustrates exemplary components and an exemplary process 300 for obtaining eye-tracking data. The gaze-tracking algorithm discussed above may be built upon three modules that interoperate to provide a fast and robust eyes- and face-tracking system. Data received from video stream 310 may be input into face detection module 320 and face feature localization module 330. Face detection module 320, at junction 340, may check whether a face is present in front of the camera, receiving video stream 310.

In the case that a face is present, face detection module 320 may determine a raw estimate of the 2D position in the image of the face and facial features eyebrows, eyes, nostrils, and mouth) and provide the estimate to face features localization module 330. Face features localization module 330 may find the position of the features. When the feature positions are known, the 3D position and orientation of the face may be estimated. Gaze direction may be processed by combining face orientation estimation and a raw estimate of eyeball orientation processed from the iris center position in the eyes.

If a face is not detected, control passes back to face detection module 320. If a face is detected but not enough facial features are detected to provide reliable data at junction 350, control similarly passes back to face detection module 320. Module 320 may try again after more data is received from video stream 310. Once enough good features have been detected at junction 350, control passes to feature position prediction module 360. Feature position prediction module 360 may process the position of each feature for the next frame. This estimate may be built using Kalman filtering on the 3D positions of each feature. The estimated 3D positions may then be back-projected to the 2D camera plane to predict the pixel positions of all the features. Then, these 2D positions may be sent to face features localization module 330 to help it process the next frame.

The eye-tracking method is not hunted to this embodiment. Any eye-tracking method may be used. It may consist of a high-sensitivity black and white camera (using, e.g., a Sony EXView HAD CCD chip), equipped with a simple NIR filter letting only NIR wavelengths pass and a set of IR-LEDs to produce a corneal reflection on the user's cornea. The IR-LEDs may be positioned below instead of beside the camera. This positioning avoids shadowing the opposite eye by the user's nose and thus supports the usage of reflections in both eyes. To test different distances between the camera and the user, the optical devices may be mounted on a rack. In some embodiments, only three of the nine IR-LEDs mounted on the rack are used, as they already provide sufficient light intensity to produce a reliably detectable reflection on the cornea. One example implementation of this embodiment can use the OpenCV library. Machine dependent parts may be encapsulated so that the program may be compiled and run on any operating systems (e.g. Linux).

When implemented using the OpenCV library, if no previous eye position from preceding frames is known, the input image may first be scanned for possible circles, using an appropriately adapted Hough algorithm. An image of reduced size may be used in this step. In one embodiment, limiting the Hough parameters (for example, the radius) to a reasonable range may provide an additional speedup. Next, the detected candidates may be checked against further constraints like a suitable distance of the pupils and a realistic roll angle between them. If no matching pair of pupils is found, the image may be discarded. For successfully matched pairs of pupils, sub-images around the estimated pupil center may be extracted for further processing. Especially due to interlace effects, but also caused by other influences the pupil center coordinates, pupils found by the initial Hough algorithm may not be sufficiently accurate for further processing. For exact calculation of gaze direction, however, this coordinate should be as accurate as possible.

One example approach for obtaining a usable pupil center estimation is actually finding the center of the pupil in an image. However, the invention is not limited to this embodiment. In another embodiment, for example, pupil center estimation may be accomplished by finding the center of the iris, or the like. While the iris provides a larger structure and thus higher stability for the estimation, it is often partly covered by the eyelid and thus not entirely visible. In addition, its outer bound may not always have a high contrast to the surrounding parts of the image. The pupil, however, can be easily spotted as the darkest region of the (sub-)image.

Using the center of the Hough-circle as a base, the surrounding dark pixels may be collected to form the pupil region. The center of gravity for all pupil pixels may be calculated and considered to be the eye position. This value may also form the starting point for the next cycle. If the eyelids are detected to be closed during this step, the image may be discarded. The radius of the iris may now be estimated by looking for its outer bound. This radius may later limit the search area for glints. An additional sub-image may be extracted from the eye image, centered on the pupil center and slightly larger than the iris. This image may be checked for the conical reflection using a simple pattern matching approach. If no reflection is found, the image may be discarded. Otherwise, the optical eye center may be estimated and the gaze direction may be calculated. It may then be intersected with the monitor plane to calculate the estimated viewing point. These calculations may be done for both eyes independently. The estimated viewing point may then be used for further processing. For instance, the estimated viewing point can be reported to the window management system of a user's device as mouse or screen coordinates, thus providing a way to connect the eye-tracking method discussed herein to existing software.

A user's device may also include other eye-tracking methods and systems such as those included and/or implied in the descriptions of the various eye-tracking operations described herein. In one embodiment, the eye-tracking system may include an external system (e.g., a Tobii T60 XL eye tracker, Tobii TX 300 eye tracker or similar eye-tracking system, user-wearable glasses or goggles that track eye motion) communicatively coupled (e.g., with it USB cable, with a short-range Wi-Fi connection, or the like) with the device. In other embodiments, eye-tracking systems may be integrated into the device. For example, the eye-tracking system may be integrated as a user-facing, camera with concomitant eye-tracking utilities installed, in the device.

In one embodiment, the specification of the user-facing camera may be varied according to the resolution needed to differentiate the elements of a displayed message. For example, the sampling rate of the user-facing camera may be increased to accommodate a smaller display. Additionally, in some embodiments, more than one user-facing camera (e.g., binocular tracking) may be integrated into the device to acquire more than one eye-tracking sample. The user device may include image-processing utilities necessary to integrate the images acquired by the user-facing camera and then map the eye direction and motion to the coordinates of the digital document on the display. In some embodiments, the user device may also include a utility for synchronization of gaze data with data from other sources, e.g., accelerometers, gyroscopes, or the like. In some embodiments, the eye-tracking method and system may include other devices to assist in eye-tracking operations, and process 300 can be modified and/or augmented based, for example, on the type of computing device used to obtain eye-tracking, data. For example, the user device may include a user-facing infrared source that may be reflected from the eye and sensed by an optical sensor such as a user-facing camera.

Figure 4:
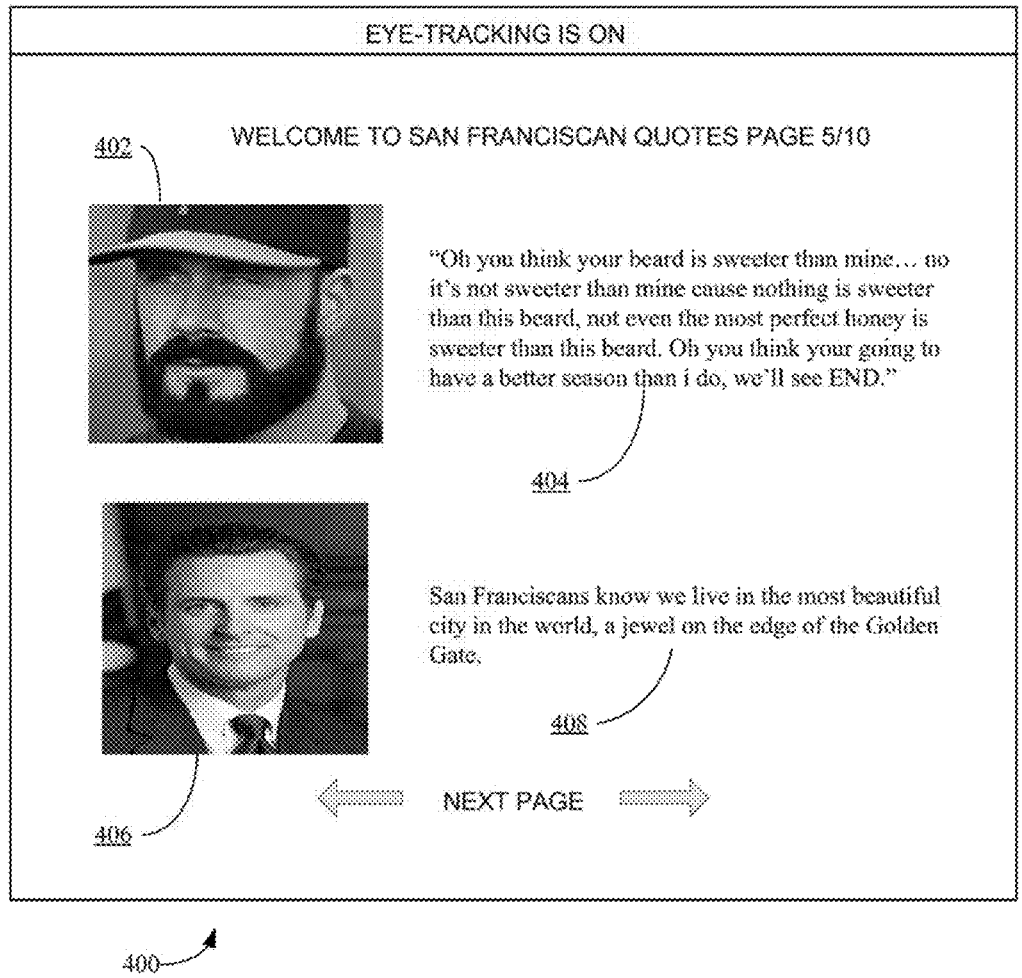
FIG. 4 illustrates an example webpage for which a user's eye-tracking data can be monitored.

FIG. 4 illustrates an example webpage 400 for which a user's eye-tracking data can be monitored. The webpage 400 can include various elements such as 402-408. Each webpage element can include certain attributes. For example, the digital images 402 and 406 can include ALT tags (alt attributes), alternative text, image files names, text labels and/or other metadata that can be analyzed to obtain image attributes. Additionally, nearby text such as the 404 for image 402 and 408 for image 406 can be analyzed to determine attributes of the images (and/or the text fields, themselves, as well). Moreover, other methodologies can be utilized to determine webpage element attributes such as various web crawler methods for determining attributes of webpage elements. Optionally, a web crawler can be configured to crawl various webpages and in other embodiments other types of digital documents) and maintain an index of descriptions of the webpages and/or attributes contained therein. Furthermore, the web browser can include an indication (e.g. in a toolbar) that the eye-tracking feature is activated.

Figure 5:
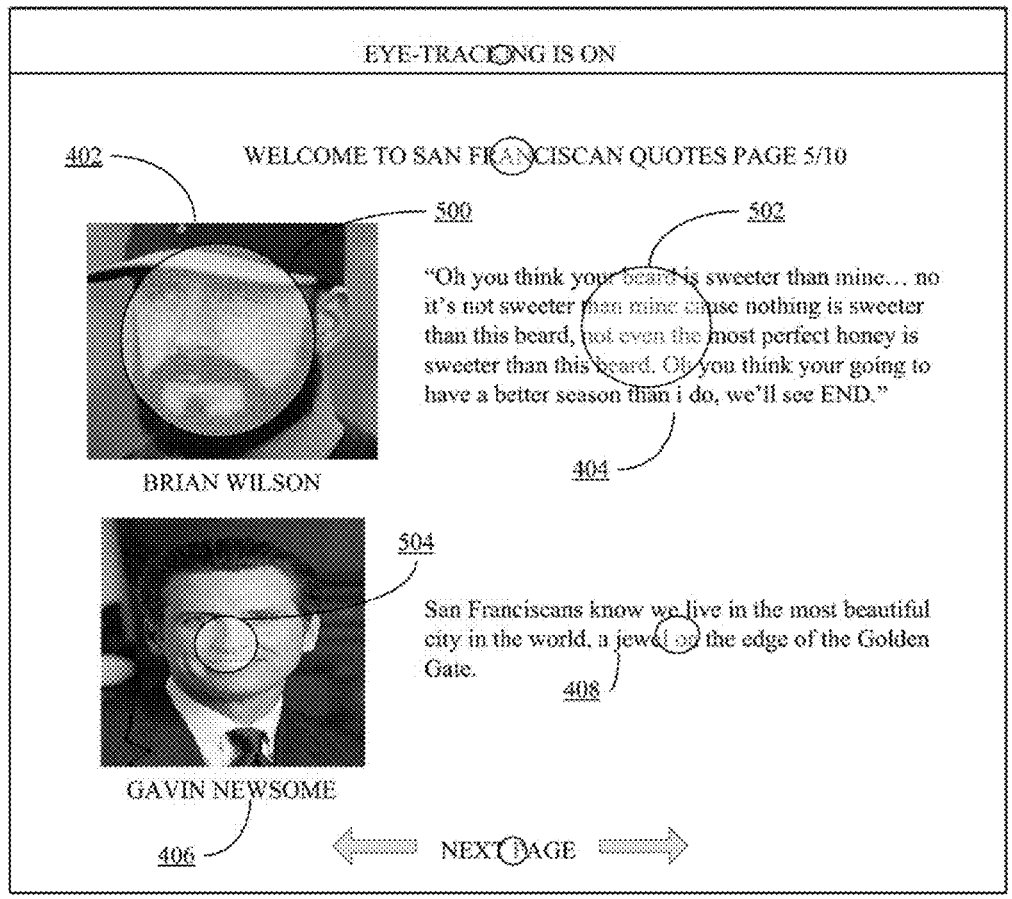
FIG. 5 illustrates the example webpage with a graphical representation of the user's eye-tracking data values for the various fields of the digital document.

FIG. 5 illustrates the example webpage 400 with graphical representations of the user's eye-tracking data values, such as 500-504, for the various elements of the digital document. The purpose of the graphical representation is intended for illustrative purposes and may not be displayed as shown. However, eye-tracking data values (e.g. time of gaze duration for an element, eye-motion vectors, saccadic pattern vectors, etc.) can be placed in data structures that also indicate the associated webpage elements for example, tables that could be used to generate a heat map of eye-tracking data that overlays webpage 400 and/or scan path maps. The graphical illustration 500 of the eye-tracking data values indicate that element 402 is associated with the greatest eye-tracking data value (e.g. the user's eyes were directed to this element the longest cumulative period, etc), then graphical illustration 502, then graphical illustration 504. The system may be set to obtain attributes for webpage elements with eye-tracking data values that equal or exceed the value of 502 for example. Consequently, attributes of elements 402 and 404 may be obtained, indexed and provided to a database that is accessible by a search engine server, in one example, eye-tracking data and attribute extraction operations can be performed by a client application residing, on the computing device that displays the webpage. In another example, attribute extraction operations can be performed in a remote server that obtains the eye-tracking data from the client.

Optionally, an image may be further parsed into sub-elements that can be analyzed/identified with an image recognition algorithm. For example, image 502 can be broken into sub-elements that recognize the individual's identity (Brian Wilson baseball pitcher), a beard, a baseball cap, and the like. Eye-tracking data can then be acquired at the granular level of the sub-elements with respect to the image. Optionally, similar operation can be performed with respect to a field of text with eye-tracking data being acquired at the level of each term. Furthermore, attributes of one element can be included as attributes in another nearby related element. For example, attributes of text 504 can be included in related image 502. In the particular example of FIG. 5, the attributes of element 502 can include terms: 'Brian Wilson', 'beard', 'San Francisco', 'sweet', where 'San Francisco', 'sweet' are obtained from nearby elements and 'Brian Wilson' is obtained from an attribute element of the image and 'beard' is obtained from image recognition analysis.

Sorting Documents

Figure 6:
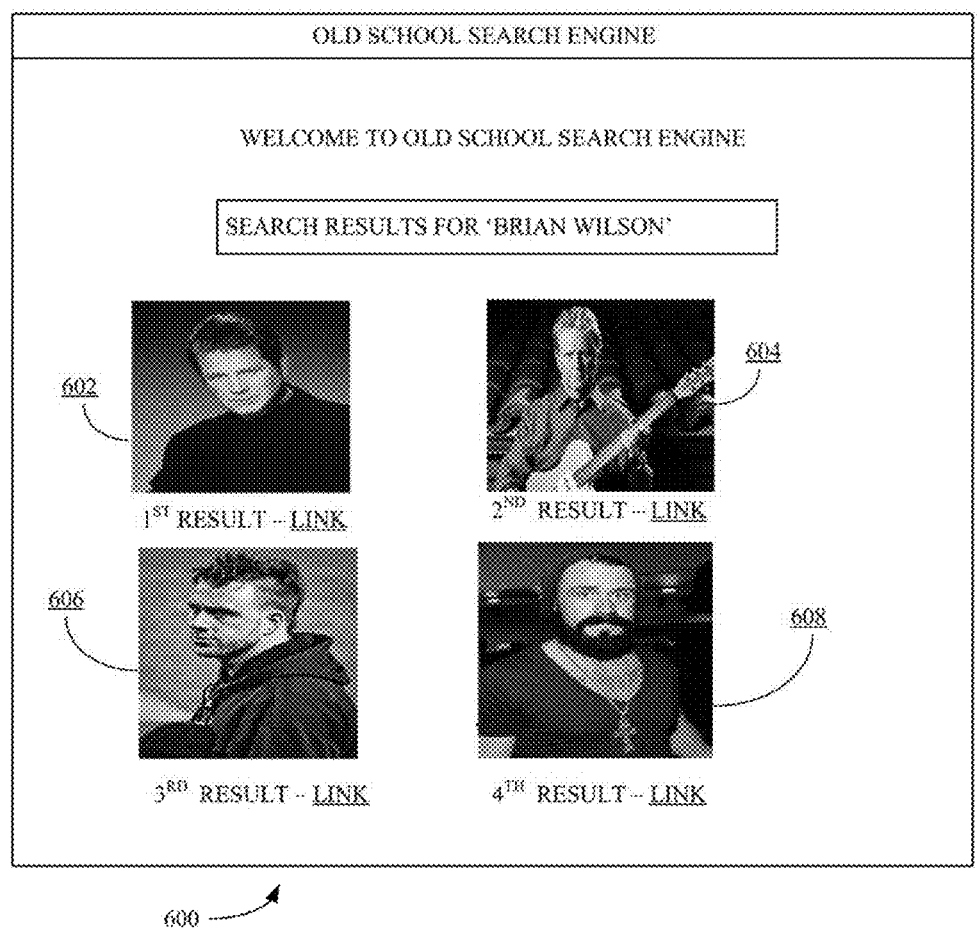
FIG. 6 illustrates an example of an Internet search performed according to certain prior-art search methods after the eye-tracking data of FIG. 5 is obtained.

FIG. 6 illustrates an example of an Internet search performed according to prior-art search methods after the eye-tracking data of FIG. 5 is obtained. For example, after viewing the quote from Brian Wilson, the pitcher for the San Francisco Giants baseball franchise, a user may use an Internet search engine's webpage to perform an Internet image search for 'Brian Wilson'. However, multiple famous individuals can be named 'Brian Wilson'. Current Internet search methodologies (e.g. such as PageRank®, Boolean searches, term vector models, etc) do not take into account the user's current interests as indicated by eye-tracking data. Consequently, a search for 'Brian Wilson' can return images for another famous Brian Wilson 602 and 604 such as the singer/song writer for the Beach Boys band. These images can be scored higher by the search engine and sorted before images of Brian Wilson the pitcher 606 and 608 as shown in FIG. 6.

Figure 7:
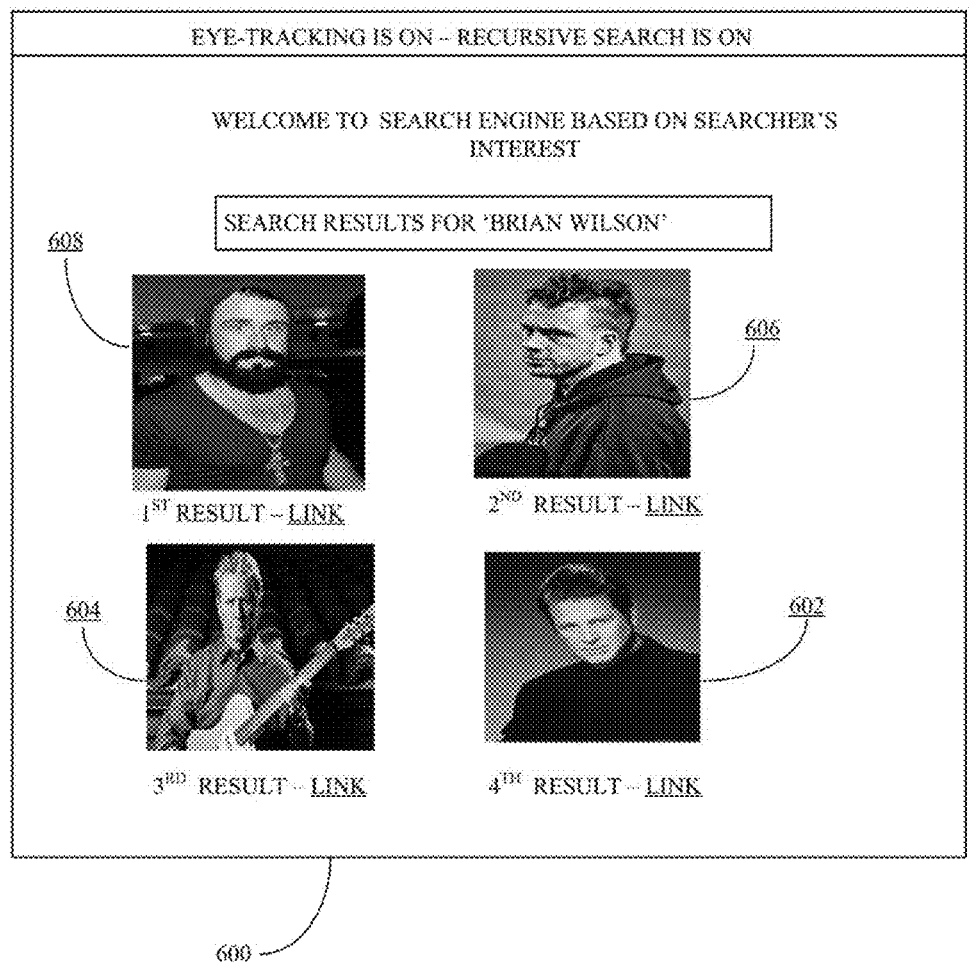
FIG. 7 illustrates an example of an Internet search performed according to an example embodiment after the eye-tracking data of FIG. 5 is obtained.

FIG. 7 illustrates an example of an Internet search performed according to an example embodiment after the eye-tracking data of FIG. 5 is obtained. For example, the search engine can access the database and/or an index of the database that includes the attributes ('Brian Wilson', 'beard', 'San Francisco', 'sweet') of previously analyzed element of interest. The search engine can determine that the user's present search terms 'Brian Wilson' match an associated set of attribute terms. The search engine can then use these other terms to sort the search query results and present a list of images that are more relevant to the user's current state (i.e. an interest in Brian Wilson the pitcher). It should be noted that the Internet search need not be performed with the same computing device that displayed the webpage of FIG. 5, as the attributes can be stored to a database that can be accessed by the search engine discussed with reference to FIG. 7. It is noted that the remaining attributes ('beard', 'San Francisco', 'sweet') can be used by the search engine, in other ways as well. For example, the remaining, attributes can be used as an implicit and/or explicit auto-complete operation on a search for Brian Wilson performed by the user and/or with the same web browser (as indicated by session data, cookies, etc). The search engine can utilized various methods to recognize a user such as cookies, log-in data, facial recognition data, social network data and the like, in order to utilized appropriate attribute data associated with the user. Optionally, attribute data can be time stamped and a relevancy value can be scored based on the recency of its acquisition through eye-tracking.

Figure 8:
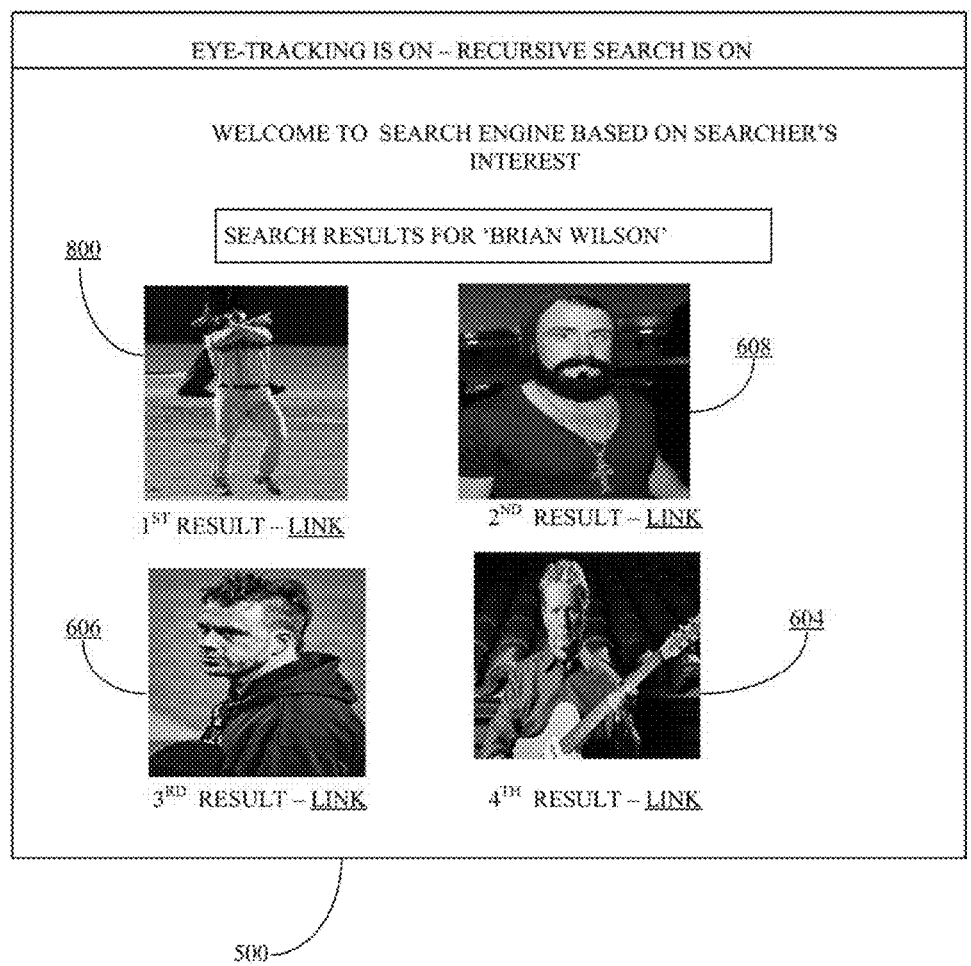
FIG. 8 illustrates an example of recursive searching with eye-tracking data obtained from a user according to an example embodiment.

FIG. 8 illustrates an example of recursive search with eye-tracking data obtained from a user according to an example embodiment. A user can view the search query results for the Brian Wilson image search provided in FIG. 7. The device displaying the webpage of the results can include an eye-tracking system that obtains eye-tracking data of the user as the user views the search results. As described above, the various methods for obtaining attributes of elements with eye-tracking data that exceeds a certain parameter can be obtained. For example, the user may view the cross necklace around Brian Wilson's neck in image 608 for a greater than a specified period. An attributed acquisition operation can be performed with respect to image 608. For example, an image recognition algorithm can be performed and the sub-image determined to be a cross. The term 'cross' can then be included in the original set of attribute terms used by the search engine with regards to FIG. 7. Thus, a new search result that included a set of images sorted according to the new search terms (and optionally, the values of the eye-tracking data associated with the elements from which the attributes are derived) can be provided. Consequently, the search result provided in FIG. 8 can include a new image 800 that includes metadata that indicates the term 'cross' as well. Image 800 can receive a higher score for sorting search query results, for example, if the eye-tracking data indicates a greater period of viewing of the cross element of image 608 (and thus implying a high degree of interest on the pan of the user in the association of Brian Wilson the pitcher and a cross).

Figure 9:
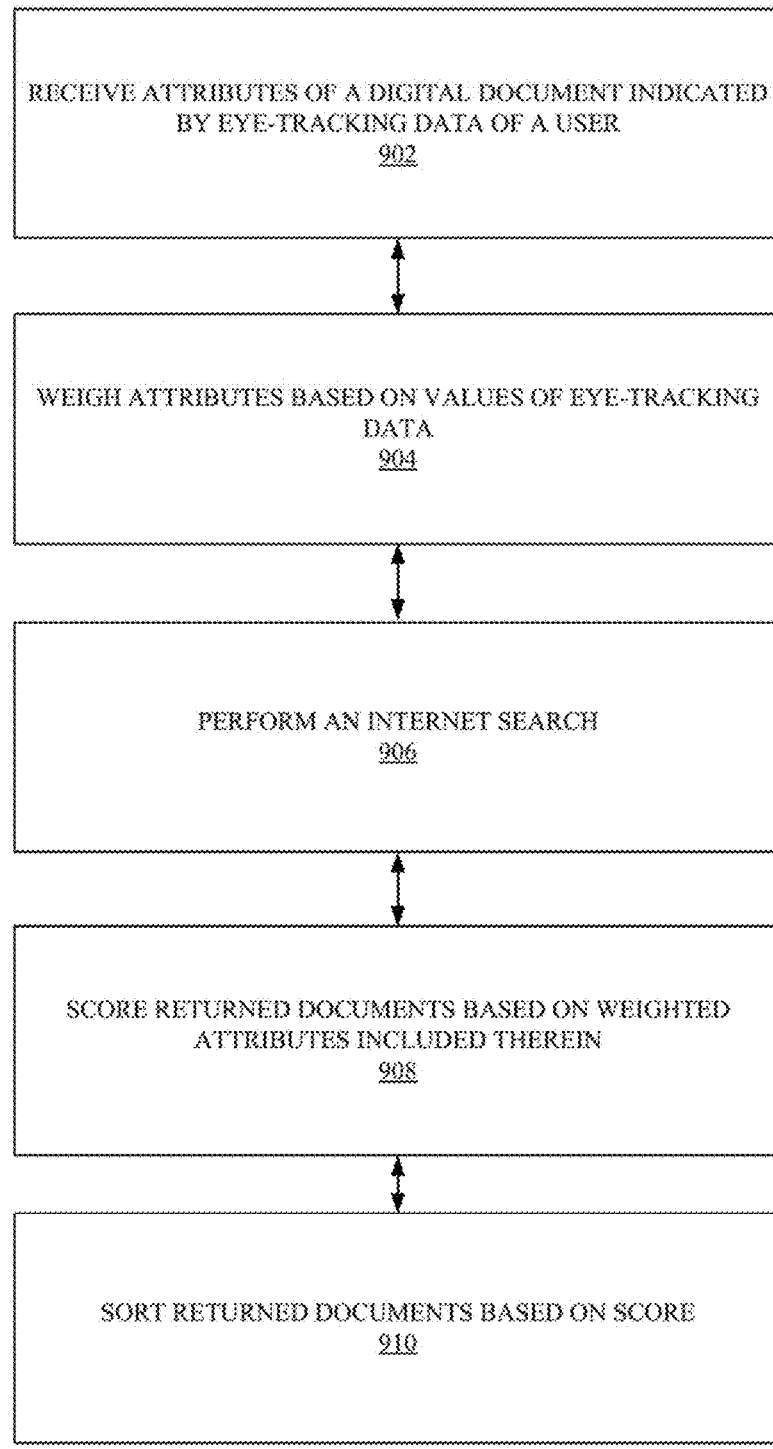
FIG. 9 is a flow chart of one implementation.

FIG. 9 is a flow chart of one implementation. In step 902 of process 900, attributes of a digital document indicated by eye-tracking data of a user can be received. For example, the attributes can be received by a server that can perform a search of a set of documents in a database. In step 904, the attributes are weighted and/or scored based on the eye-tracking data. For example, attributes associated with a longer user gaze can receive a greater weight than attributes associated with a shorter user gaze. In another example, attributes associated with a user's comprehension difficulty, as indicated by eye-tracking data, can receive greater weight than other attributes. In step 906, an Internet (or other database of digitalized documents) search can be performed. The search engine that performs the Internet search can have access to the attributes and the associated eye-tracking data. The documents returned by the search can be scored based on the weighted attributes in step 908. For example, documents that include a great number of higher scored attributes can be receive a greater scored than documents that include a fewer number of lower scored attributes and the like. The returned documents can then be sorted according the document's score in step 910.

In yet another example, a user-worn/held camera can capture images of physical objects viewed by the user. An eye-tracking system, such as eye-tracking goggles worn by the user (e.g. Tobii® Glasses Eye Tracker), can obtain the user's eye-tracking data with regards to the physical objects. Image recognition operations can be performed on images of physical objects for which the eye-tracking data values exceed a specified threshold. Moreover, the images can be parsed into sub-elements and image recognition operations can also be performed on these sub-elements. Attributes of the images and/or sub-elements cart be obtained (e.g. colors, shapes and/or size characteristics of the physical objects, GPS location of the physical objects, other environmental context values of the location of the object as obtained by sensors communicatively coupled with or integrated in the computing device, image identification, and the like). These attributes of physical objects in real-world environments can be stored in a database that is accessible by a search engine search and can be used to modify and/or augment searches of other digital document databases in order to make those searches more relevant to a user.

Optionally, various methods can be used to compensate for eye motion that is attributable factors such as digital document design and the like. For example, an average of a set of user's eye-tracking data can be obtained with respect to a digital document. A particular user's eye-tracking data with regards to a digital document can be compared to the average in order to compensate for eye patterns due to such factors as digital document design, layout and the like. A specified parameter for an eye-tracking data value to initiate an attribute acquisition operation can be based on a deviation of the particular user's eye patterns from an average and/or norm eye pattern with respect to a digital document element. For example, by way of illustration and not of limitation, the average for a fixation on a web page element may be 0.5 seconds, but the particular user may have a fixation of 1.5 seconds. In this example, a fixation deviation of 0.75 seconds can be set to trigger an attribute acquisition operation that determines the attributes of the web page element and associates them with the particular user in a database. Thus, certain types of deviations the eye-tracking data from the eye patterns of other users can indicate an interest on the part of a particular user. In another example, the various elements of a digital document could be normalized to account for such factors as size, color and prominence. Thus, for example, an element with a larger size and greater prominence (e.g. as determined by statistical studies of aggregate user behavior) could require a longer period of fixation (or other eye behavior) before an attribute acquisition operation is initiated than would a smaller element with less prominence.

In some embodiments, attributes of digital document elements that eye-tracking data indicates are not of interest to a user can also be obtained. These attributes can be used to filter out certain search query results. Returning, to the example of FIG. 6, element 604 is an image of Brian Wilson the musician. Eye-tracking data can indicate that the user showed little interest in this image. The attributes of element 604 can be "Brian Wilson, guitar, musician Beach Boys". The attributes in common with elements of interest can be removed leaving a set terms including "guitar, musician, Beach Boys". These attributes of non-interest can be used to lower the score of certain search-engine results (e.g. other images with at least one attribute of "guitar, musician, Beach Boys"). Optionally, the search engine may enable a user a degree of manual control as to which settings are active. Moreover, a user may be able to manually reset and/or set which attributes are utilized to score search query results. Additionally, a user may be enabled to provide feedback regarding certain elements and indicate that they are not of interest to the user (e.g. via an input field on a web page of the search engine's web site). This information can also be utilized by the search engine when scoring documents.

Optionally, several sets of attributes can be combined such as those obtained over a specified period by a user. The resulting set of attributes can itself be scored (e.g. based on number of occurrences of an attribute and/or genre of attributes over a specified period) and sorted (e.g. ranked according to frequency over the specified period). In this way, for example, attributes with a low score (and thus a lower relevancy to a user) can be removed from the set of attributes later used to score and sort a search query result.

System Architecture

Figure 10:
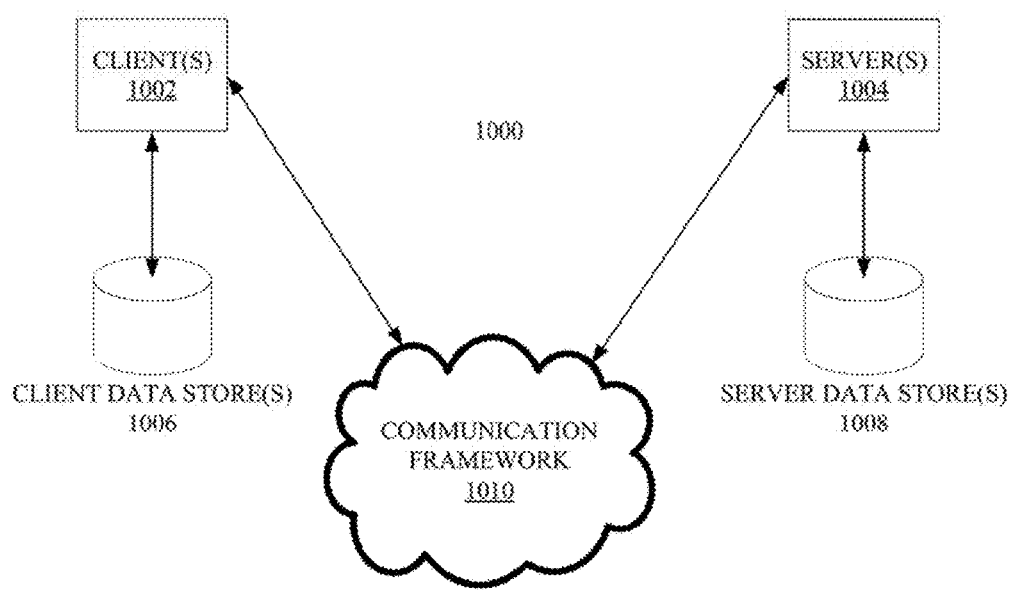
FIG. 10 illustrates a sample-computing environment that can be utilized in some embodiments.

FIG. 10 illustrates a sample computing environment 1000 that can be utilized in some embodiments. The system 1000 further illustrates a system that includes one or more client(s) 1002. The client(s) 1002 can be hardware and or software (e.g., threads, processes, computing, devices). The system 1000 also includes one or more server(s) 1004. The server(s) 1004 can also be hardware and/or software e.g., threads, processes, computing devices). One possible communication between a client. 1002 and a server 1004 may be in the form of a data packet adapted to be transmitted between two or more computer processes. The system 1000 includes a communication framework 1010 that can be employed to facilitate communications between the client(s) 1002 and the server(s) 1004. The client(s) 1002 are connected to one or more client data store(s) 1006 that can be employed to store information local to the client(s) 1002. Similarly, the server(s) 1004 are connected to one or more server data store(s) 1008 that can be employed to store information local to the server(s) 1004.

Figure 11:
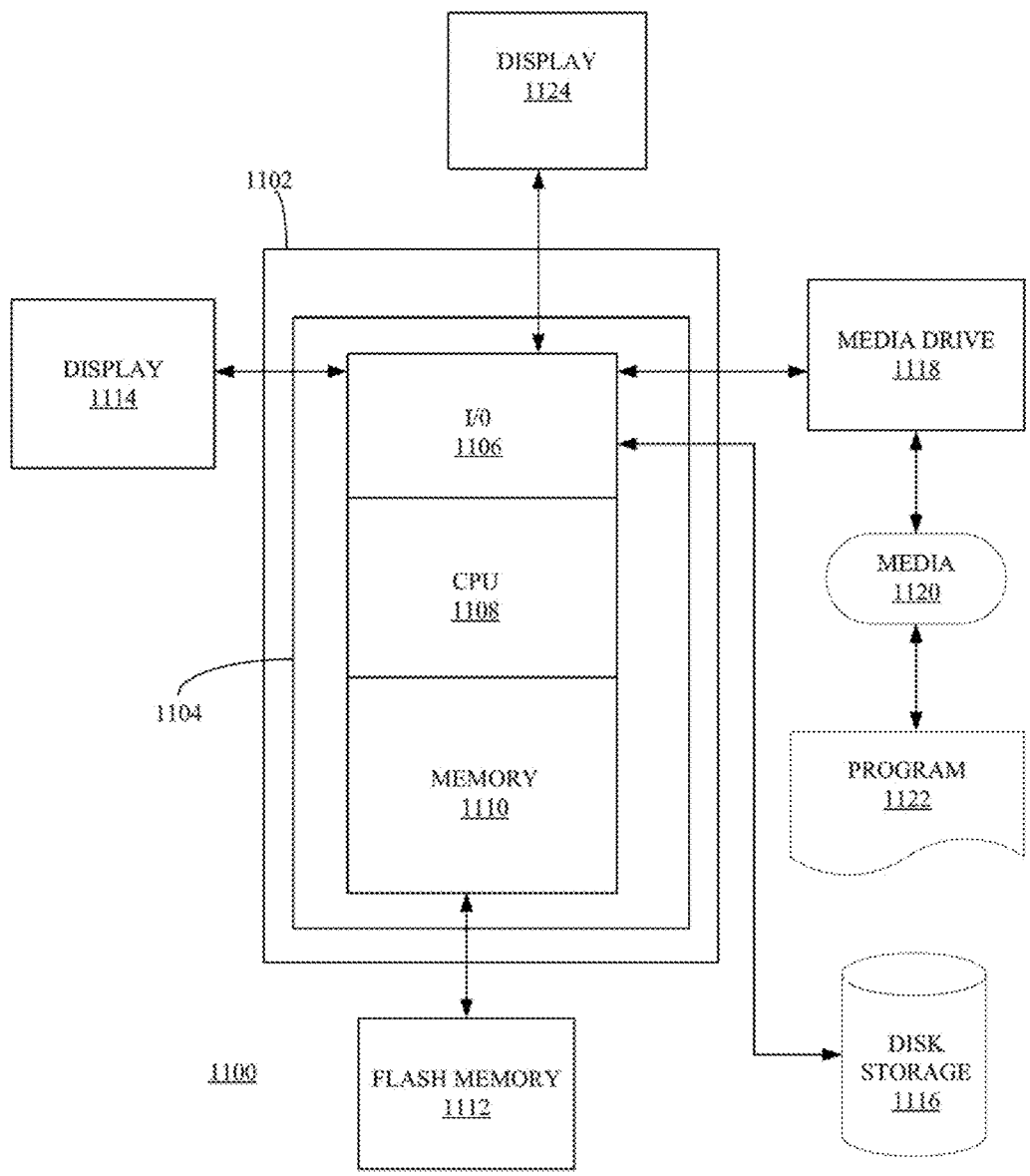
FIG. 11 illustrates an exemplary computing system that can be configured to implement aspects of some embodiments.

FIG. 11 depicts an exemplary computing system 1100 that can be configured to perform any one of the above-described processes. In this context, computing system 1100 may include, for example, a processor, memory storage, and I/O devices (e.g., monitor keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform the above-described processes. The main system 1102 includes a motherboard 1104 having an I/O section 1106, one or more central processing units (CPU) 1108, and a memory section 1110, which may have a flash memory card 1112 related to it. The I/O section 1106 is connected to a display 1124, a keyboard 1114, a disk storage unit 1416, and a media drive unit 1118. The media drive unit 1118 can read/write a computer-readable medium 1120, which can contain programs 1122 and/or data. Although, not shown, in some embodiments, computing system 1100 can include an eye-tracking system and/or be coupled with an eye-tracking system.

It is noted that in some embodiments, an online advertising service may place advertising copy at the top or bottom of, or beside, the list of search results displays for a particular search query. The search query and/or the advertising copy (e.g. a set of advertisements) can be weighted and/or sorted based on processes 100 and/or 900. Advertisement copy can scored according to weighted attributes based on eye tracking data. For example, can be used as the returned documents of process 900. Web page documents can comprise advertisement documents and/or or hyperlinks to an advertiser's web page. In one example, the advertisement copy can be presented as an augmented-reality element (e.g. on a mobile device and/or with augmented-reality smart glasses). The various weighting and/or ranking/sorting processes utilized herein based on eye-tracking data can be used to determine the relevancy of one or more particular advertisements to a user and select which advertisement(s) to provide to the user via an augmented-reality display.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language e.g., Pascal, C, C++, Java) or some specialized application-specific language.

Although the present embodiments have been described with reference to specific example embodiments, various modifications and changes can be made to these embodiments without departing from the broader spirit and scope of the Various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather titan a restrictive sense. In some embodiments, the machine-readable medium can be a non-transitory form of machine-readable medium.

What is claimed as new and desired to be protected by Letters Patent of the United States is:

1. A computer-implemented method for scoring documents comprising:
   obtaining a set of attributes derived from an element of a web page, wherein the element is identified from eye-tracking data of a user viewing the web page, wherein the element of the web page comprises an image portion of the web page, and wherein an attribute comprises an identity of the image portion of the web page;
   weighting each attribute of the set of attributes based on the eye-tracking data with respect to each attribute and a time-stamp value of the eye-tracking data;
   receiving a search query of a database, wherein the search query comprises at least one query term, wherein the database comprises an index of web pages;
   identifying a set of web page documents in the database according to the search query;
   determining an attribute score for each document based on a relevancy of each web page document to the set of weighted attributes, and wherein determining the attribute score for each document comprises:
      determining a number of matches or a probability weight of a match between the set of attributes and each document;

sorting the search query results according to the attribute score of each web page document; and
determining a commonality between the query term and at least one member of the set of attributes.

2. The computer-implement method of claim 1, wherein determining the attribute score for each document comprises:
   determining a number of matches between the set of attributes and at least one theme of each document.

3. The computer-implement method of claim 1, wherein the weight of each attribute decreases as a function of time.

4. The computer-implemented method of claim 3, wherein the element of the digital document comprises a digital image.

5. The computer-implemented method of claim 4, wherein attribute of the image comprises at least one of a color of the image or an object represented in the image.

6. The computer-implemented method of claim 3, wherein the element of the digital document comprises an image.

7. The computer-implemented method of claim 1, further comprising:
   obtaining a plurality of attributes from a plurality of digital documents over a specified period.

8. The computer-implemented method of claim of 7 further comprising:
   scoring each attribute of the plurality of attributes based on a relevancy of each attribute to the user.

9. The computer-implemented method of claim of 8, wherein scoring each attribute of the plurality of attributes based on a relevancy of each attribute to the user further comprises:
   determining a genre of each attribute of the plurality of attributes; and
   scoring each genre based on a number of member attributes.

10. The computer-implemented method of claim of 8, wherein determining the attribute score for each document comprises:
    determining a genre that is relevant to the search query; and
    determining a number of matches between the attributes the relevant genre and the components of each document.

11. The computer-implemented method of claim of 1, wherein the web page documents comprise advertisement copy documents.

12. The computer-implemented method of claim of 1, wherein the database is a hypermedia database.

13. A non-transitory computer-readable storage medium comprising computer-executable instructions for scoring a set of documents, the computer-executable instructions comprising instructions for:
    obtaining at least one attribute derived from an element of an augmented reality view, wherein the element is identified from eye-tracking data of a user viewing the augmented reality view, wherein the element of the an augmented reality view comprises an image of a physical object obtained by a digital camera, and wherein an attribute comprises an identity of the an augmented reality view;
    weighting each attribute of the set of attributes based on the eye-tracking data with respect to each attribute;
    receiving a search query of a database, wherein the search query comprises at least one query term, and wherein the database comprises an index of documents;
    identifying a set of documents in the database according to the search query;
    determining an attribute score for each document based on a relevancy of each web page document to the set of weighted attributes, and wherein determining the attribute score for each document further comprises:
      determining a number of matches or a probability weight of a match between the set of attributes and each document;
    ranking the set of documents according to the attribute score of each document; and
    determining a commonality between the query term and at least one member of the set of attributes.

14. The non-transitory computer-readable storage medium of claim 13, wherein the augmented reality view further comprises at least one of a web page, an image display of a digital camera or a multimedia messaging system message.

15. The non-transitory computer-readable storage medium of claim 13, wherein the attribute score of a document comprises a value determined by a comparison between a term vector representation of the document and the attribute.

16. The non-transitory computer-readable storage medium of claim 13 further comprising:
    generating a database of attributes associated with a user viewing a plurality of digital documents over a specified period; and
    ranking the database of attributes based on an attribute frequency value in the database.

17. The non-transitory computer-readable storage medium of claim 16, wherein the at least one attribute derived from the element of a digital document comprises at least a highest-ranked attribute.

18. A computer system for scoring a set of documents identified by a search query result, the system comprising:
    memory configured to store the score of each document identified by a search query result; and
    one or more processors configured to:
      obtain at least one attribute derived from an element of a web page, wherein the element is identified from eye-tracking data of a user viewing the web page, wherein the element of the web page comprises a text portion or an image portion of the web page, and wherein an attribute comprises an identity of the image portion of the web page;
      weight each attribute of the set of attributes based on the eye-tracking data with respect to each attribute;
      receive a search query of a database, wherein the search query comprises at least one query term, and wherein the database comprises an index of documents;
      identify a set of documents in the database according to the search query;
      determine an attribute score for each document based on a relevancy of each document to the set of weighted attributes, and wherein determine the attribute score for each document further comprises:
        determine a number of matches or a probability weight of a match between the set of attributes and each document;
      determine a commonality between the query term and at least one member of the set of attributes; and
      rank the set of documents according to the attribute score of each document.

* * * * *